Patented Sept. 3, 1946

2,406,909

UNITED STATES PATENT OFFICE 2,406,909

PLASTIC BONDING BASIC REFRACTORIES

Robert A. Schoenlaub, Tiffin, Ohio, assignor to Basic Refractories, Inc., Cleveland, Ohio, a corporation of Ohio No Drawing. Application November 30, 1942, Serial No. 467,386

12 Claims. (Cl. 106—58)

Basic refractories are commonly used in hearths and side walls of metallurgical furnaces. In such service, they are exposed to high temperatures, corrosive vapors, slags or metals, in a degree and character beyond the capability of normal acid refractories to withstand. Basic refractory substances differ in physical character from acid refractories, in that they are nonplastic, harsh, and devoid of cohesive properties. Acid refractory substances are plastic and cohesive or can safely be made so by incorporation of small amounts of plastic bond clay. This cohesiveness and plasticity of acid refractories is a desirable property in some relationships; and it is highly desirable to obtain such properties in basic refractory mixtures in which it is normally absent.

In basic refractory applications in which some degree of plasticity and cohesiveness is desirable, such as mortars, tap-hole mixtures, and mixtures applied by blowing with compressed air, it is common practice to achieve this plasticity by incorporation of one to five per cent of a plasticizing agent. Agents frequently used for this are, water-soluble starch, ball clay, plastic fire clays, or bentonite. Plasticity also may be achieved by some surface-active compounds or soaps, but these decrease strength and do not favorably affect cohesiveness.

Such plasticizing agents are not compatible with basic refractory substances. Starch is an organic material comprising carbon, hydrogen and oxygen, and when heated it burns or decomposes, causing a reducing condition which may be deleterious to the refractory substance. Also it leaves the individual grains of the refractory substance in poor contact with each other, thereby weakening the structure. Clays and bentonites are aluminum silicates, having compositions which are typical or inclusive as follows:

|  | Ball clay | Plastic fire clay | Bentonite |
|---|---|---|---|
|  |  |  | Per cent |
| $SiO_2$ | 46.8 | 43.4–51.1 | 62 |
| $Al_2O_3$ | 36.6 | 32.3–37.4 | 22 |
| $Fe_2O_3$ | 1.1 | 0.7–1.6 | 4 |
| CaO+MgO | 0.5 | 0.3–0.9 | 4 |
| Alkali | 1.0 | 0.1–2.0 | 2 |
| Ignition loss | 11.5 | 5.6–12.7 | 6 |

Clays and bentonites thus have the serious disadvantage of imparting to a basic refractory sufficient alumina and silica to lower the refractoriness to an undesirable extent. For satisfactory results, alumina in commercial periclase refractories used at high temperatures should not be more than 2 per cent. The usual impurities of the raw material ordinarily impart this amount, hence addition of clay or bentonite in effective amount is precluded. Basic refractory substances such as chrome ore, are somewhat less sensitive, but alumina is deleterious.

In accordance with the present invention, plasticity, cohesion and desirable working properties which are normally absent, may be imparted to basic refractories, and the chemical composition involved is such that the high temperature refractoriness of basic materials is not appreciably affected. This new bond is unique in that it introduces neither organic matter nor alumina.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The refractory material which is to be made up into refractory products is burned at suitable temperature, magnesite, dolomite, chromite, etc. being common raw materials. In general, it is necessary to properly stabilize basic substances against physical or chemical changes. The principal physical change prone to occur in basic refractories is inversion of dicalcium silicate. This may be prevented however by burning clinker which will contain dicalcium silicate, with small additions of a stabilizer such as boric oxide, chrome ore, or phosphate, as in U. S. Patent No. 2,229,297. The principal chemical change prone to occur in basic substances is hydration, with consequent disruption of bond, and even under some circumstances the heaving of a hearth or bursting of a furnace shell. Hydration of magnesia clinkers may be inhibited by suitably hard burning of the clinker and by inclusion of 3 to 4 per cent of mill scale, iron oxide or chrome ore as a burning agent.

With a basic refractory material such as magnesian clinker from calcined magnesite or dolomite, as noted foregoing, and ground and sized to desired mesh, there is incorporated as a plasticizing bond, a small amount of a plastic or gel-forming hydrous magnesium silicate. This is tacky, plastic and unctuous and swells copiously to a voluminous gel when made up with water, thereby being distinguished from material such as serpentine, talc, and the like, which are non-plastic and non-colloidal and not having the property even of dispersing in water. In important respects chemically, it is quite the opposite to bentonite, as it contains no alumina. One convenient natural source of gel-forming hydrous magnesian silicate is found near Hector, San Bernardino County, California, and the material from this deposit will be referred to hereinafter as "hectorite." Its occurrence and composition have been described in the literature, e. g. Journal of the Mineralogical Society of America, vol. 21, page 238 (1936). Such gel-forming hydrous magnesian silicate usually slightly greater than 2:1 by weight. It contains some alkali, and remarkably lithium. The analysis of hectorite as freed from fine calcite with which it is associated is as follows: ignition loss 1.7, MgO 25.1, SiO 57.8, $Fe_2O_3$ 0.1, $Al_2O_3$ 0.8, $Na_2O$ 2.9. An average analysis of the material just as it occurs, and as it may in fact also be used, is as follows: ignition loss 25.55, MgO 11.09, $SiO_2$ 26.14, $Fe_2O_3$ 0.06, $Al_2O_3$ 0.36, CaO 29.28, $Na_2O$ 1.30. The material is particularly different also from bentonite in its X-ray diffraction pattern and indices of refraction.

The usual commercial grades of gel-forming hydrous magnesium silicate, incorporated with the ground refractory, when tempered with water, provides plasticity, water retention, adhesiveness and tackiness. Up to about 6 per cent may be incorporated, including generally calcite and impurities which may be present in commercial deposits. In general, commercial hectorite imparts plasticity and cohesion when used in amounts up to 2 per cent. In amounts from 2 to 6 per cent of the weight of the refractory, it imparts false plasticity and stickiness which are useful for certain purposes.

In general, mortar as used for joining and setting of refractory shapes is composed of material of the same general composition as refractories but ground fine and mixed with enough water to form a more or less coherent mass which serves to fill up the irregular voids between the bricks or shapes. In such mortars it is difficult to keep the pulverized particles in suspension and free from segregation. Such mixtures are often harsh and not retentive of enough water to completely set the bond between the bricks.

In the preparation of refractory mortars, regardless of their nature, it is important that the mortar have a capacity for water retention so that when used on porous brick it is not dehydrated too rapidly. Furthermore the mortar should be plastic and adhesive without being too tacky or sticky. Mortars should also be neither grainy from too much coarse material, nor slimy from too much fines, and should have some dry strength and should develop a more or less monolithic structure at service temperature. Especially, mortars should be chemically compatible with the refractories with which they are used, and preferably should have refractoriness of the same order. The combination of all of these conditions has been difficult to attain. With the present invention, however, a basic mortar, such as suitable for either magnesite or chrome brick, can be compounded from a dead-burned magnesite clinker. Usually, a sizing of 90 per cent −100 mesh including 30 per cent −200 mesh is satisfactory. Desirably, 1 to 3 per cent of sodium carbonate, sulphite or nitrite is incorporated for low and intermediate temperature bonds, and if a particularly strong but not especially refractory mortar is desired, 1 to 3 per cent of a soluble sodium silicate may be included. The addition of appreciable amounts of silica should be avoided, however, in general, as such addition causes excess shrinkage and crazing of the mortar at high temperature. The gel-forming hydrous magnesian silicate, or commercial hectorite, is included in amount usually 1 to 2 per cent, this imparting desirable working properties. More of the magnesian silicate tends to make the mortar buttery or sticky. This plasticizing agent should be fine and well dispersed throughout the refractory material.

For use in refractory mixtures coarser than mortars, where the degree of plasticity is desired for proper emplacement, similarly the magnesian silicate introduces particular advantages. For instance, it can be used in mixtures which are tempered with water and packed about hollow metal forms to fashion the tap holes of metallurgical furnaces. Such applications require a greater degree of volume stability and strength than is usually necessary for mortars. The volume stability can be obtained by suitable proportioning of coarse magnesite clinker with intermediate and fine sized clinker. Thus, excellent results are found to occur with 40 per cent of −6+30 mesh size, 20 per cent of −30+60 mesh size, and 40 per cent of −150 mesh size. About 5 per cent of sodium silicate is desirably included, and hectorite 0.5 to 2 per cent by weight. This composition has excellent working plasticity and cohesiveness, and is not subject to segregation of coarse matter during difficult forming operations.

Illustrative examples of plastic bonding compositions in accordance with the invention are as follows:

I. *Mortar for laying up magnesite or chrome brick.*—Clinker formed from dolomite, magnesite and chrome ore, by burning the pulverized batch at 3000° F. or higher in a rotary-kiln, and for instance having a composition such as MgO 81 per cent, CaO 8 per cent, $SiO_2$ 4 per cent, $Fe_2O_3$ 3 per cent, $Cr_2O_3$ 2 per cent, $Al_2O_3$ 2 per cent, and $B_2O_3$ 0.05 per cent, 94 per cent −100 mesh, with 3 per cent −100 mesh mill scale, 2 per cent −100 mesh sodium nitrate, and 1 per cent −200 mesh hectorite.

II. *Plastic basic refractory for tap-holes.*—Clinkers, such as the foregoing, are sized and mixed with the other materials, in amount of 40 per cent −4+15 mesh clinker, 20 per cent −15+100 mesh clinker, 31.5 per cent −200 mesh clinker, 5 per cent water soluble sodium silicate, 2 per cent −200 mesh sodium carbonate, 1.0 per cent trisodium phosphate, and 1.5 per cent −200 mesh hectorite. This is tempered with about 7.5 per cent of water, mixed thoroughly, and tamped about a hollow metal form to make a furnace taphole.

Other modes of applying the principle of the invention may be employed, change being made as regards the details described, provided the features stated in any of the following claims, or the equivalent of such, be employed.

I therefore particularly point out and distinctly claim as my invention:

1. A refractory composition, comprising a pulverulent mixture of ground dry magnesian clinker and a small amount of dry substantially aluminum-free hectorite of the character of that from San Bernardino County, California.

2. A refractory composition, comprising a pulverulent mixture of ground dry magnesian clinker and a small amount of dry gel-forming hydrous magnesium silicate.

3. A refractory composition, comprising about 94 per cent of —100 mesh magnesian clinker, about 3 per cent of iron oxide, about 2 per cent of sodium nitrate, and about 1 per cent of hectorite.

4. A refractory composition, comprising about 40 per cent of —4+15 mesh magnesian clinker, about 20 per cent of —15+100 mesh magnesian clinker, about 31.5 per cent of —200 mesh magnesian clinker, about 5 per cent of water-soluble sodium silicate, about 2 per cent of sodium carbonate, and about 1.5 per cent of hectorite.

5. A refractory composition, comprising about 94 per cent of —100 mesh magnesian clinker, about 3 per cent of iron oxide, about 2 per cent of sodium nitrate, and about 1 per cent of a gel-forming hydrous magnesian silicate.

6. A refractory composition, comprising about 40 per cent of —4+15 mesh magnesian clinker, about 20 per cent of —15+100 mesh magnesian clinker, about 31.5 per cent of —200 mesh magnesian clinker, about 5 per cent of water-soluble sodium silicate, about 1 per cent of trisodium phosphate, about 2 per cent of sodium carbonate, and about 1.5 per cent of a hydrous magnesian silicate.

7. A process of plasticizing ground magnesian clinker, which comprises disseminating about 1 per cent of hectorite in about 94 per cent of 100 mesh magnesian clinker, about 3 per cent of iron oxide, and about 2 per cent of sodium nitrate.

8. A process of bonding ground magnesian clinker, which comprises disseminating about 1.5 per cent of hectorite in about 40 per cent of —4+15 mesh magnesian clinker, about 20 per cent of —15+100 mesh clinker, about 31.5 per cent of —200 mesh clinker, about 5 per cent of water soluble sodium silicate, and about 2 per cent of sodium carbonate.

9. A process of bonding ground magnesian clinker, which comprises disseminating about 1 per cent of a gel-forming hydrous magnesian silicate in about 94 per cent of 100 mesh magnesian clinker, about 3 per cent of iron oxide, and about 2 per cent of sodium nitrate.

10. A process of bonding ground magnesian clinker, which comprises disseminating about 1.5 per cent of a gel-forming hydrous magnesian silicate in about 40 per cent of —4+15 mesh magnesian clinker, about 20 per cent of —15 +100 mesh clinker, about 31.5 per cent of —200 mesh clinker, about 5 per cent of water-soluble sodium silicate, about 1 per cent of trisodium phosphate, and about 2 per cent of sodium carbonate.

11. A process of the character described, which comprises disseminating in dry ground magnesian clinker a small amount of dry ground hectorite of the character of that from San Bernardino County, California, and subsequently gelling the dry hectorite by introducing water.

12. A process of the character described, which comprises disseminating in dry ground magnesian clinker a small amount of dry fine gel-forming hydrous magnesium silicate, and subsequently gelling the dry magnesium silicate by introducing water.

ROBERT A. SCHOENLAUB.